April 8, 1930.  C. T. SMALL  1,753,756
HOISTING AND TILTING TRUCK FOR TANKS
Filed Jan. 12, 1928   3 Sheets-Sheet 2

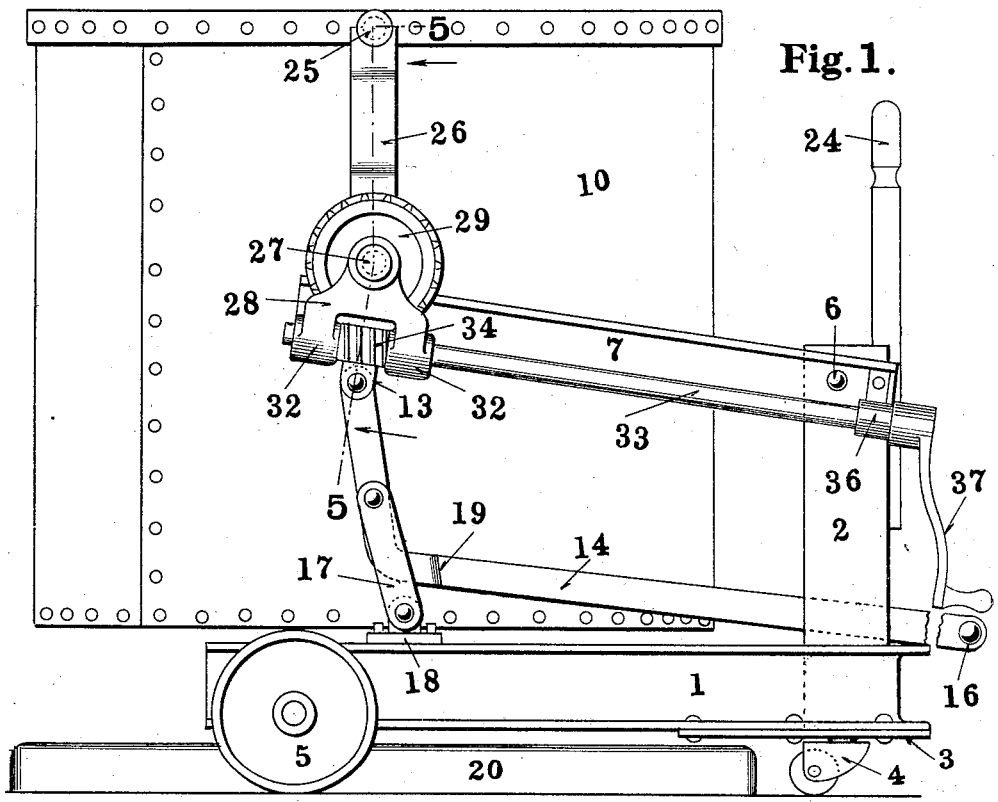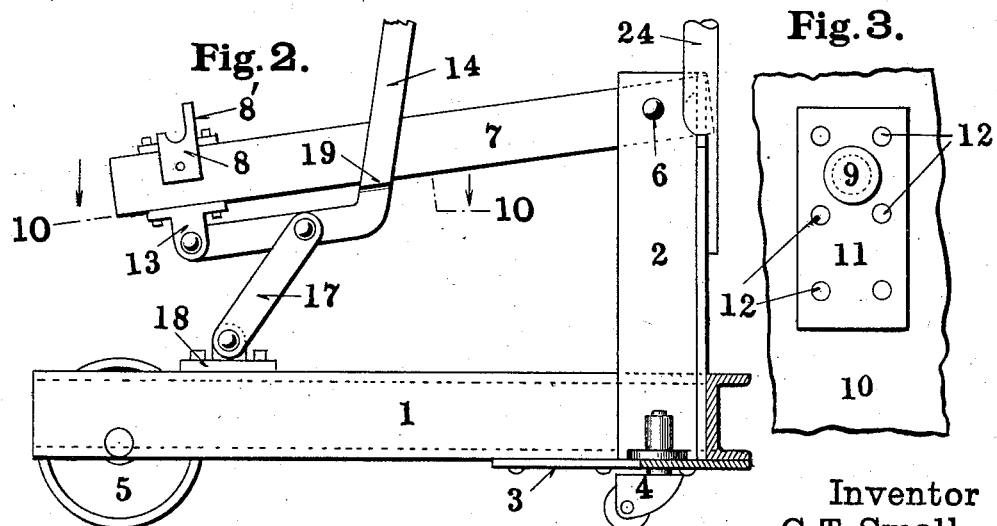

Inventor
C. T. Small
By E. E. Huffman
Att'y.

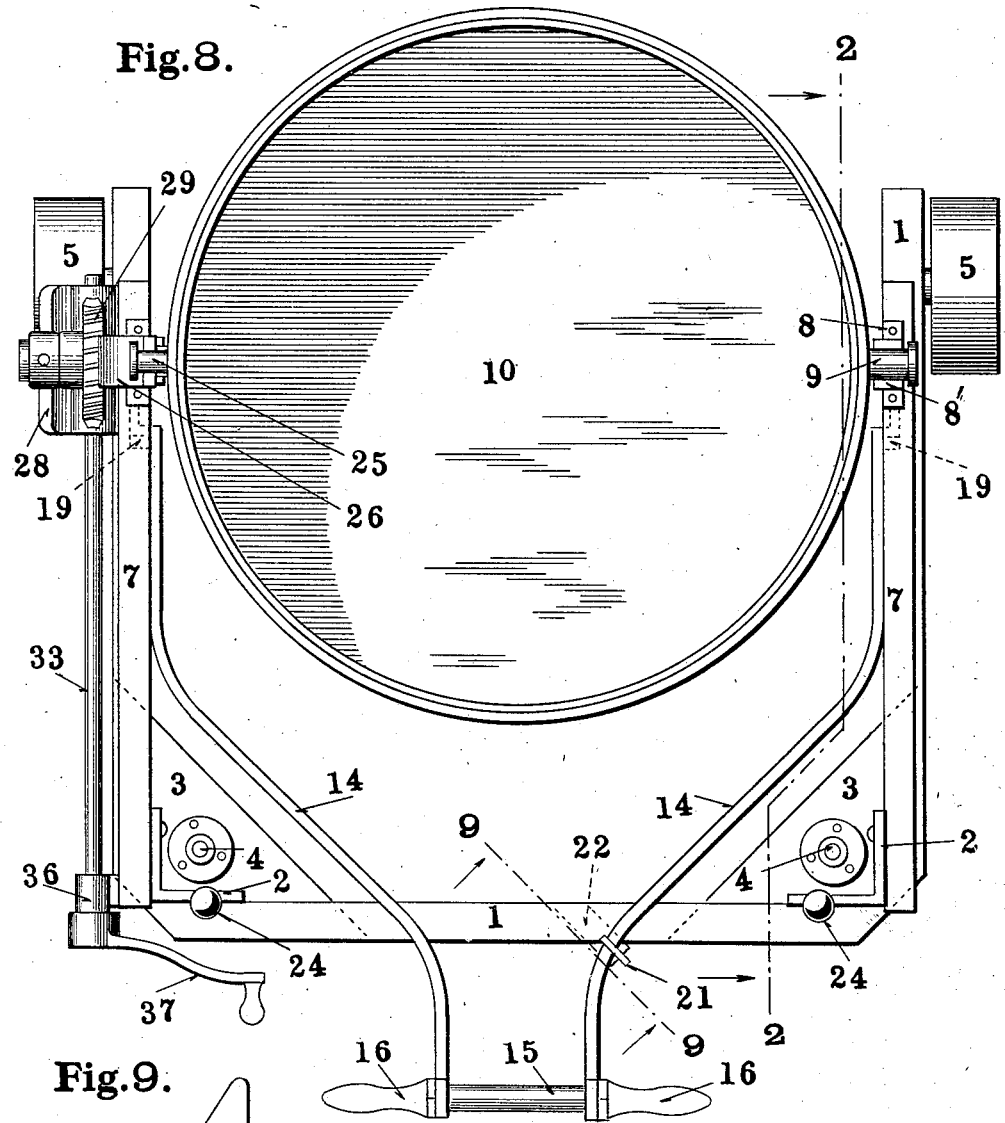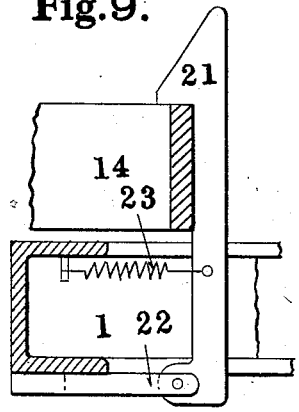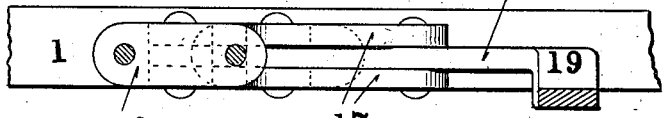

Patented Apr. 8, 1930

1,753,756

UNITED STATES PATENT OFFICE

CHESLEY T. SMALL, OF ST. LOUIS, MISSOURI

HOISTING AND TILTING TRUCK FOR TANKS

Application filed January 12, 1928. Serial No. 246,148.

My invention relates to a hoisting and tilting truck for tanks by means of which tanks of relatively large size may be manipulated by a single operator who by the aid of the truck may not only easily transport the tanks from place to place, but also discharge their contents.

Figure 4:
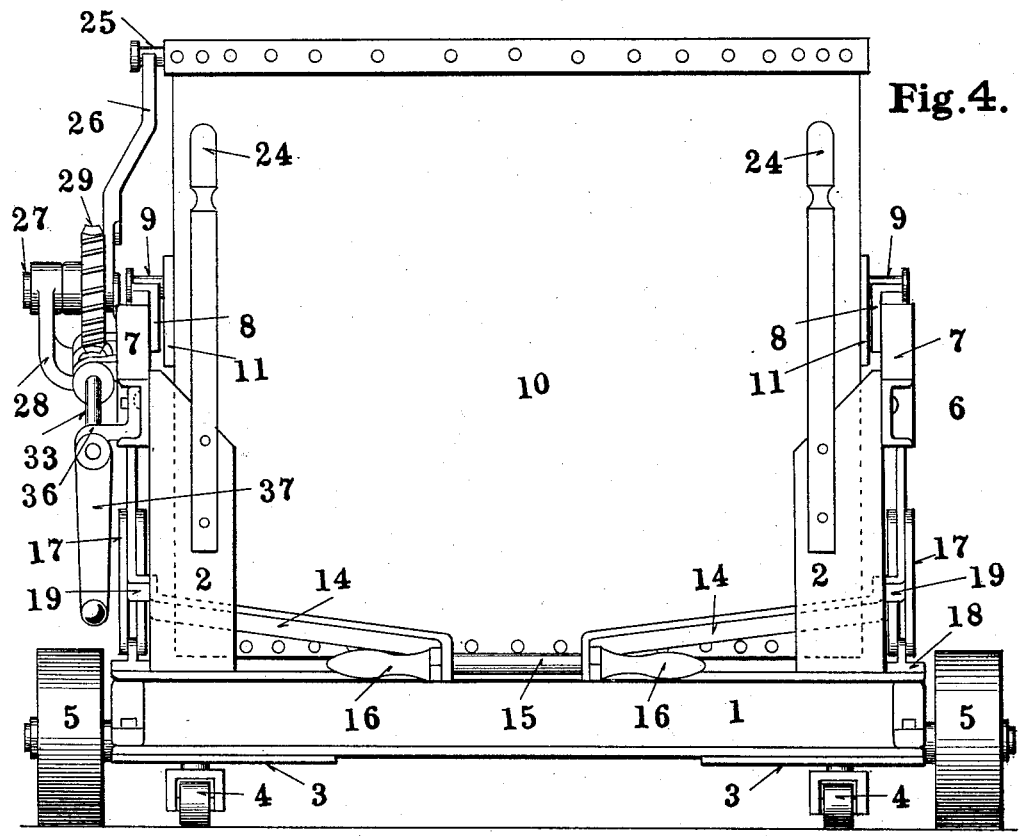
Figures 5, 6:
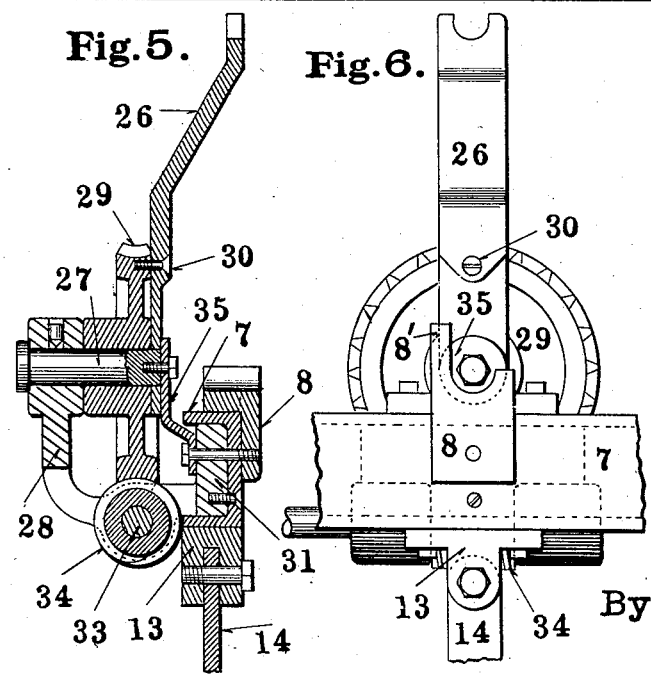
Figure 7:
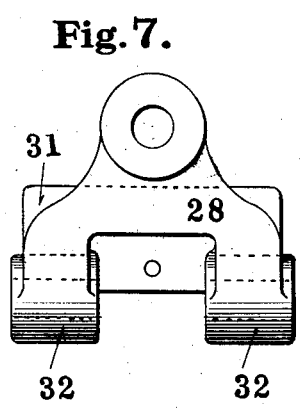

In the accompanying drawings, which illustrate one form of truck made in accordance with my invention, Figure 1 is a side elevation; Figure 2 is a section taken on the line 2—2 of Figure 8, the tank being removed; Figure 3 is a fragmentary view showing the method of securing the trunnions to the tank; Figure 4 is a front elevation; Figure 5 is an enlarged section taken on the line 5—5 of Figure 1; Figure 6 is a side view of the parts shown in Figure 5; Figure 7 is a detached view of the worm wheel bracket; Figure 8 is a top plan view; Figure 9 is an enlarged section taken on the line 9—9 of Figure 8; and Figure 10 is an enlarged section taken on the line 10—10 of Figure 2.

The frame of the truck consists of a U-shaped base 1, preferably of channel section, and a pair of uprights 2. The uprights 2 may be made integral with the base or, as shown in the drawings, carried by corner braces 3 riveted or otherwise secured to the base. Casters 4 are mounted in the corner braces and the rear end of the truck is supported by wheels 5. Pivoted to the upper end of each of the uprights 2 at point 6 is a channel bar 7 having mounted on its rear end a bearing block 8 adapted to engage with trunnions 9 of the tank 10. These trunnions are preferably carried by plates 11 secured to the tank by rivets 12, as shown in Figure 3. Secured to the under side of each of the channel bars 7 is a bracket 13 to which is pivoted the rear end of a bent lever 14. The front ends of the lever are connected by a bar 15 and preferably provided with hand holds 16. Links 17 are pivoted at their upper ends to the levers and at their lower ends to brackets 18 carried by the base.

When the levers 14 are in raised position, as shown in Figure 2, the rear ends of the channel bars 7 are lowered so that the bearing blocks 8 may be moved under the trunnions 9 of the tank. This downward movement of the rear ends of the bars is limited by contact of offsets 19 in the levers 14 with the lower edges of the channel bars 7. The levers 14 are now forced downwardly by means of the hand holds 16 and the tank is raised from the floor or from the tank support 20, as shown in Figure 1. In this position the pivot connecting the links to the levers should move slightly past the line connecting the pivot points of the brackets 13 and 18. This will prevent lowering of the tank when the hands are removed from the hand holds 16 but in order to positively prevent accidental dropping of the tank during transportation I provide a locking device, as shown in Figures 8 and 9. This consists of a detent 21 pivoted to a plate 22 carried by the base and engaging with the upper edge of one of the levers 14. A spring 23 holds the detent in engagement with the lever. The tank may now be moved from place to place, the truck being propelled by handles 24 secured to the uprights 2.

In order that the tank may be tilted to discharge its contents it is provided on one side, directly above the trunnion, with a pin 25. This pin is adapted to be engaged by an arm 26 at the same time the bearing blocks 8 engage the trunnions. The inner end of the arm 26 surrounds a stud 27 carried by a bracket 28 and having mounted on it a worm wheel 29 to which the arm is secured by a screw 30. Bracket 28 is provided with a plate 31 secured to the left hand channel bar 7 and with a pair of bearings 32 for shaft 33. Rigidly mounted on this shaft between the bearings 32 is a worm 34 meshing with the worm wheel 29. The inner end of the stud 27 is supported by a brace 35 secured to it and to the plate 31. Supporting the front end of the shaft 33 is a bearing 36 secured to the bar 7, and said shaft is provided with a crank handle 37 by means of which it is rotated.

The manner of using my truck is as follows: The levers 14 being raised to lower the rear end of the bars 7, the sides of the truck frame are positioned to straddle the tank with the bearing blocks 8 directly under the trunnions of the tank and the arm 26 directly under the pin. The positioning of the bearing blocks under the trunnions is secured by stops 8' carried by the blocks and adapted to strike against the trunnions. The levers 14 are now forced downwardly by means of the hand holds 16 thus raising the tank into the position shown in Figure 1, in which position it is positively held by the engagement of the detent 21 with one of the levers. The truck, together with the supported tank, may now be moved to any place where it is desired to discharge the contents of the tank and the tank tilted by rotating the crank handle 37. The direction of the rotation will be contra-clockwise when the worm 34 is right hand, as shown in the drawings. After the contents of the tank has been discharged the tank is returned to upright position by a reverse rotation of the crank handle when it may be conveyed to any desired location and deposited by releasing the detent 21 and raising the levers 14.

Having described my invention, what I claim as new and desire to secure by Letters Patent of the United States is:

1. In a device of the class described, the combination with a tank having trunnions, of a truck adapted to straddle the tank, a pair of bars pivotally mounted on said truck, bearings carried by said bars and adapted to engage the tank trunnions, a pair of bent levers pivoted to said bars, links pivotally connecting said levers to the truck, and means carried by one of said bars for tilting the tank to discharge its contents.

2. In a device of the class described, the combination with a tank having trunnions, of a truck adapted to straddle the tank, a pair of bars pivotally mounted on said truck, bearings carried by said bars and adapted to engage the tank trunnions, a pair of bent levers pivoted to said bars, links pivotally connecting said levers to the truck, a shaft carried by one of said bars, a worm actuated by said shaft, a worm wheel meshing with said worm, and connections between said worm wheel and tank for tilting the latter to discharge its contents.

3. In a device of the class described, the combination with a tank provided with trunnions and a pin, of a truck adapted to straddle the tank, a pair of bars pivotally mounted on said truck, bearings carried by said bars for engaging said trunnions, lever connections for swinging said bars on their pivots to elevate the tank, a shaft carried by one of said bars, a worm on said shaft, a worm wheel meshing with said worm, and an arm carried by said worm wheel and engaging said pin to tilt the tank and discharge its contents.

4. In a device of the class described, the combination with a tank provided with trunnions and a pin, of a truck adapted to straddle the tank, a pair of bars pivotally mounted on said truck, bearings carried by said bars for engaging said trunnions, lever connections for swinging said bars on their pivots to elevate the tank, a bracket carried by one of said bars, a worm shaft journaled in said bracket, a worm on said shaft, a stud carried by said bracket, a worm wheel on said stud and engaging with said worm, a supporting brace for said stud, and an arm carried by said worm wheel and engaging the pin on the tank for tilting the latter to discharge its contents.

5. In a device of the class described, the combination with a tank provided with trunnions and a pin, of a truck having a base adapted to straddle the tank, uprights carried by said base, a pair of bars pivoted to said uprights, bearings on said bars for engaging the tank trunnions, lever connection for swinging said bars on their pivots, gearing carried by one of said bars, and an arm actuated by said gearing and engaging said pin to tilt the tank.

6. In a device of the class described, the combination with a tank provided with trunnions and a pin, of a truck having a base adapted to straddle the tank, uprights carried by said base, a pair of bars pivoted to said uprights, bearings on said bars for engaging the tank trunnions, a pair of bent levers pivoted to said bars, links connecting said levers to the truck base, a worm shaft carried by one of said bars, a worm on said shaft, a worm wheel meshing with said worm, and an arm on said wheel engaging with the tank pin to tilt the tank to discharge its contents.

In testimony whereof, I hereunto affix my signature, this 9th day of January, 1928.

CHESLEY T. SMALL.